Patented Feb. 3, 1925.

1,525,251

UNITED STATES PATENT OFFICE.

CHARLES EDWARD NORTH, OF MONTCLAIR, NEW JERSEY, ASSIGNOR TO THE MILK OIL CORPORATION, OF WILMINGTON, DELAWARE, A CORPORATION OF DELAWARE.

PROCESS OF EMULSIFYING MILK FAT.

No Drawing.   Application filed February 16, 1924.  Serial No. 693,335.

*To all whom it may concern:*

Be it known that I, CHARLES E. NORTH, a citizen of the United States of America, residing at Montclair, in the county of Essex and State of New Jersey, have invented certain new and useful Improvements in Processes of Emulsifying Milk Fat, of which the following is a full, clear, and exact description.

For a number of years milk has been preserved in an imperishable form by separating out the fat or oil and drying the skim milk in powdered form. Other methods of preserving the milk and cream have been practiced or proposed, but for present purposes these may be disregarded.

This milk powder being practically free from all fat content has been used in making richer milk or cream by confectioners, ice-cream manufacturers and others, by emulsifying a solution of the powder and water with butter, or more recently with pure dry milk oil, but all such processes have followed substantially the same lines; namely, the use of mechanical methods for breaking up the melted butter or milk fat into fine globules in the presence of the solution, as by forcing the material under heavy pressure or by centrifugal force through small orifices. The machines used for this purpose have been variously known as emulsors, creamers, viscolizers, homogenizers and the like, each having its own degree of efficiency dependent upon the fineness of the fat globules which it produces. Homogenizers, for example, produce globules so fine as to be almost immeasurable.

By means of no mechanical appliance, however, may milk or cream be produced from skim-milk powder, dehydrated fat and water which has the character of natural milk and cream. The homogenizer will produce a stable emulsion in which the fat particles are so fine that they are kept in suspension by friction alone and hence will not rise to the surface as cream on milk, but such cream may not be whipped, and when used in hot beverages, such as coffee, it rises as suds, and in other respects does not conform to natural cream. The homogenizing machine, moreover, is very large and costly, works under six thousand pounds pressure and is impracticable for any but the largest milk concerns.

No other known type of machine is capable of producing a stable emulsion of this character, the instability being due to the fact that friction is the only factor relied upon to hold the fat in suspension, and unless the particles or globules are as imponderable as those produced by a homogenizer, this alone is not sufficient. As a result all other emulsions result in the rapid agglomeration of fat globules and then rising to the surface, forming a large and hard plug of fat.

The failures to produce such emulsions in stable form are due to a disregard of the scientific principles upon which a stable emulsion must be based, and while there are many theories which have been advanced to explain the changes taking place when emulsions of fat are made and when they are broken all agree in the one fact that the stability of fat emulsions in water, is due to the presence of a third element, the emulsifying agent. This element in milk and cream is the solids not fat, or in such emulsions as are now under consideration it is the dried skim-milk.

The stability of any emulsion of fat and water depends upon a proper use of this emulsifying agent. A simple mixture, for example, of all three elements does not permit the emulsifying agent to carry out its functions, and even forcing such a mixture through the machines above described, fails to take advantage of the action of the emulsifying agent and disregards entirely the real nature of its action. This will be seen from the following considerations.

A study of the chemistry and physics of emulsions shows that in milk and cream, it is the solids not fat which act as the emulsifying agent between the fat and the water. These solids comprise not only casein but also milk sugar, albumen, salts and minor quantities of other non-fat solids, but the chief ingredient and the principal emulsifying element is the casein, and for sake of convenience this alone may be considered.

The action of casein as the emulsifying agent in milk and cream is due to the fact that it is soluble in both fat and water, its solubility in water being much greater than in fat. In forming a union with the fat the casein coats the surface of each fat globule with a thin fine film, which does not extend deeply into the globules, but far enough to form that type of union described chemically as adsorption, which may be regarded as a partial union of the casein and fat less intimate than a complete solution, for it is merely embedded in the surface of the fat only. On the other hand, the casein is dissolved or suspended in collodial form throughout the entire mass of water.

From the standpoint of chemical reaction it may be properly said that the water does not come in contact with the fat globules because of the intervening layer of casein, but this layer may be conceived of as exceedingly thin and may be described as composed of casein molecules having their heads in the fat and their tails in the water. The stability of emulsions of fat in milk, therefore, while it depends to some extent upon friction of the fat globules against the surrounding mass, is due to a much greater extent to the union of casein, the emulsifying agent, with fat globules. No mechanical method of emulsification can bring about such union and this is why all such emulsions are unstable.

In the improved method of producing emulsions of milk fat having permanent stability and all of the characteristics of natural milk or cream, upon which this application for Letters Patent is based I proceed as follows—

I first melt the entire quantity of milk fat which is required to make up a certain amount of milk or cream of given richness. For this I may use any temperature above the melting point of the fat, but generally 110° F.

I then add to this melted fat the entire quantity of casein or dried skim-milk which is necessary to correspond to the formula for the milk or cream to be produced, and by any form of stirrer or mixing apparatus I agitate the two materials throughly and sufficiently to yield a uniform mixture. This requires a very slight or moderate agitation for only a few moments of time.

I next add to this mixture a certain portion of warm water, the amount of which is so measured that it shall bear a definite ratio to the amount of the fat and the skim-milk. In practice I have found that I may use a quantity of water equal to from one-eighth to one-third of the quantity of fat, but this need not be the exact relation, and the whole is then subjected to a second agitation, but a very moderate one since its only object is the collecting together of the particles of emulsified fat which immediately results from the union of emulsifying agent with the water, on the one hand and the fat on the other.

The binding action of the dried skim-milk on the fat and the water results in an extremely rapid emulsification, and a very moderate amount of agitation, by stirring, paddling or churning almost immediately changes the appearance of the mass from an oily mixture to that of a creamy paste resembling corn-starch or a cream-white mucilage.

The speed of agitation must be regulated by the operator according to the appearance of the mass, the emulsion will be forced to much more quickly form if the agitation is at first very slow until the mass thickens. As soon as such thickening becomes evident, a much more rapid agitation will be found to have a great advantage, and this is due to the rapid emulsification which results from the friction of the pasty mass on itself, by which the fat is reduced to finer and finer globules. The production of these finer globules rapidly distributes the emulsifying agent, the non-fat solids, throughout the mass and the multiplication of the surface of the fat globules rapidly increases the area which the emulsifying agent is required to cover.

Dehydrated fat itself not only adsorbs casein, on the surface, but it has a strong and direct affinity for water so that a portion of the added water is actually absorbed by the fat. Hence, as the fat globules multiply and their surface increases, more water must be added to supply the demands of both the casein and the fat. The emulsification therefore cannot be regarded as complete until this additional water is added.

Experience will teach when the emulsification is complete, but it may be readily determined by observation of samples of the mixture under the microscope, and by the use of a micrometer. For example, if a formula is used consisting of 7 parts fat, 1 part dried skim-milk and 2 parts water, and these ingredients are mixed and agitated as above set forth for approximately five minutes, a sample under the microscope may shown fat globules having a diameter averaging 30 mu. If now to this paste is added two additional parts of water and the agitation continued for a second period of five minutes, the globules may be reduced to 10 mu in diameter. Further agitation may result in the reduction in the size of the globules to 5 mu, and this may be determined by a third observation. This is the condition to obtain for the best results and a permanent emulsion. In natural fresh milk the fat globules average 5 mu in diameter.

When the emulsion has been brought to this condition all of the water required to make the composition of the mixture conform to the cream or the milk which it is desired to produce may be added and thoroughly mixed with the pasty mass. The emulsion so produced is so uniform and complete that the paste absorbs very quickly and mixes very perfectly and thoroughly with any water which may be added.

The finished product should be at once cooled and put up in final containers such as glass. It will be found after 24, 48 hours, or longer periods of time that the emulsion is perfectly stable, and that the product is undistinguishable from fresh milk or cream; whereas, in all cases where the emulsion has been effected by mechanical means it is not stable and a hard plug of fat rises to the surface.

In an application filed by me on August 16, 1923, Serial No. 657,823, I have set forth a process for emulsifying milk fat which consists in making a paste of dried skim-milk and water to which the melted fat is gradually added in small amounts regulated in frequency by the consistency of the paste which is produced as the result of agitation. In this process the fat being added by slow degrees, and in many small portions, all requiring close observation on the part of the operator to prevent impairment of the integrity of the paste by two large additions of oil at one time, not only a higher degree of skill was demanded, but the time required was longer and the utensils or apparatus was more complicated than by the process which I have now described herein. It is a marked advantage of the present process that all of the ingredients are measured out and combined in a much more simple manner, which requires only one vessel and obviates any close and careful observation of conditions and changes. Another great advantage is that all of the fat is subjected to the same amount of agitation, so that a much more uniform emulsion is produced.

What I claim as my invention is:—

1. In the process of emulsifying milk fat with milk solids not fat and water, bringing together the milk fat and milk solids not fat and mixing these dehydrated products before adding the water until adsorption of the solids not fat is accomplished by the fat.

2. In the process of emulsifying milk fat with milk solids not fat and water, which consists in mixing all of the fat and all of the solids not fat at one time, which are to make up the desired product, and then adding the water.

3. In the process of producing an emulsion of milk fat, milk solids not fat and water, mixing together all of the milk fat and all of the solids not fat which may be required for a given product and then adding water in small amounts and agitating the mixture to produce a perfect emulsion.

4. In the process of emulsifying milk fat and milk solids not fat and water, bringing together the dehydrated melted milk fat and the dry milk solids not fat, and mixing the same by any proper apparatus, then adding water in small amounts and agitating the same to produce a perfect emulsion.

5. In the process of emulsifying milk fat and milk solids not fat and water, bringing together the milk fat and the solids not fat and mixing the same, then adding small amounts of water and agitating the mixture upon each addition of water until the size of the fat globules is reduced to that of such globules in natural milk.

In testimony whereof I hereto affix my signature.

CHARLES EDWARD NORTH.